United States Patent
Kita et al.

[11] Patent Number: 6,036,427
[45] Date of Patent: Mar. 14, 2000

[54] GUIDED VEHICLE SYSTEM FOR TRANSPORTING LOADS

[75] Inventors: Hiroaki Kita, Tajimi; Haruhiro Watanabe, Komaki, both of Japan

[73] Assignee: Daifuku Co., Ltd., Japan

[21] Appl. No.: 08/862,936

[22] Filed: May 29, 1997

[30] Foreign Application Priority Data

May 29, 1996 [JP] Japan .................................. 8-134967
Oct. 24, 1996 [JP] Japan .................................. 8-281981

[51] Int. Cl.[7] .................................................. B65G 67/02
[52] U.S. Cl. .......................................... 414/398; 104/119
[58] Field of Search ........................... 414/398, 281–283; 104/118, 119; 105/141, 144

[56] References Cited

U.S. PATENT DOCUMENTS

| | | | |
|---|---|---|---|
| 507,402 | 10/1893 | Beecher | 105/144 X |
| 1,847,211 | 3/1932 | Cramer | 105/144 X |
| 3,518,945 | 7/1970 | Raney et al. | 104/119 |
| 3,782,565 | 1/1974 | Doran et al. | 414/281 X |
| 3,951,277 | 4/1976 | Hegelman | 414/281 X |
| 4,093,084 | 6/1978 | Ringer | 414/398 X |
| 4,260,869 | 4/1981 | Slavens et al. | 104/119 X |
| 4,534,692 | 8/1985 | Shiomi et al. | 414/282 |
| 4,787,804 | 11/1988 | Edenäs | 414/281 |
| 5,090,558 | 2/1992 | Hatouchi | 198/781 |
| 5,134,353 | 7/1992 | Kita et al. | 318/587 |
| 5,161,698 | 11/1992 | Hatouchi et al. | 211/122 |
| 5,164,648 | 11/1992 | Kita et al. | 318/587 |
| 5,178,506 | 1/1993 | Meschi | 414/281 X |
| 5,192,903 | 3/1993 | Kita et al. | 318/587 |
| 5,325,788 | 7/1994 | Strickland et al. | 104/119 |
| 5,333,983 | 8/1994 | Hatouchi et al. | 414/331 |
| 5,383,757 | 1/1995 | Takaoka et al. | 414/240 |
| 5,401,229 | 3/1995 | Otsuka et al. | 198/465.1 X |
| 5,466,109 | 11/1995 | Iizuka | 414/283 |
| 5,525,106 | 6/1996 | Iizuka et al. | 454/187 |
| 5,636,727 | 6/1997 | Neri et al. | 414/281 X |
| 5,676,061 | 10/1997 | Loomer | 105/141 |

FOREIGN PATENT DOCUMENTS

| | | |
|---|---|---|
| 59-59564 | 4/1984 | Japan . |
| 59-45541 | 11/1984 | Japan . |
| 62-23863 | 1/1987 | Japan . |
| 63-29667 | 6/1988 | Japan . |
| 4121269 | 4/1992 | Japan . |
| 2510670 | 4/1996 | Japan . |

*Primary Examiner*—David A. Bucci
*Attorney, Agent, or Firm*—Morrison Law Firm

[57] ABSTRACT

A vehicle transport system and accompanying guide device designed to serve in automated warehouses has a guide rail that guides the transport vehicle. The transport vehicle has a carrying platform. The vehicle runs along the rail astride it and linked by connecting guides. The guide rail is located beneath an upper surface of the carrying platform so that material carried thereon can be transferred across the rail to staging areas on the other side of the rail. By locating the vehicle astride the rail, the guide rail, which projects upwardly from the floor, does not interfere with access to the carrying platform. In an embodiment of the invention, the drive wheel of the vehicle is located at a longitudinal midpoint of the transport vehicle to minimize the parasitic effects on the guides connecting the vehicle to the rail generated by application of traction forces, applied by a drive wheel, to the side of the rail.

16 Claims, 6 Drawing Sheets

GUIDED VEHICLE SYSTEM FOR TRANSPORTING LOADS

BACKGROUND OF THE INVENTION

The present invention relates to vehicles used to transport loads (hereafter, "transport vehicles") that are guided by guide rails and guide device for such vehicles.

Transport vehicles and their associated guide device are used in automated warehouses and various types of plants. There are various types of transport vehicles aside from those guided by guide rails. For example, some types of transport vehicles use magnetic induction via magnetic tape to define a guide path. Another example, is the widely-used forklift.

These vehicles have their associated advantages and drawbacks. Vehicles that are guided by guide rails, however, have major advantages not available in the other types of vehicles. These advantages include the capability of safely moving different types of loads, which is made possible by the smoothness of operations, as well as the capability of improved efficiency resulting from increased driving speed.

On the other hand, these vehicles require the installation of guide rails along the travel path, and this is one factor that has prevented more widespread application of these vehicles.

It is possible to embed the guide rails along the travel path, but the task of laying the guide rails is involved and expensive. As a result, guide rails are more frequently placed directly on the floor. In such above-ground rail installations, however, the rail interferes with other traffic and operations. Also, in conventional transport vehicles, the load is carried over the rail so that the guide rail projects away from the side of the carrying platform. This configuration presents problems where a standard forklift must be used to transport a load to and from the transport vehicle next to the travel path of the transport vehicle, (including, of course, when the transport vehicle breaks down). In such conventional transport vehicles, the guide rail projecting adjacent the load carrying area interferes with the movement of the forklift (or other transporter) potentially preventing it from getting close to the load carrying area.

OBJECTS AND SUMMARY OF THE INVENTION

One object of the present invention is to overcome the drawbacks of the conventional technology described above. Another object of the invention is to provide a transport vehicle and guide device for such vehicles that can maintain the advantages of rail-guided transport vehicles while also making possible an expanded range of applications including permitting forklifts and other transporters to approach the transport vehicle to load it.

Briefly, a transport vehicle and accompanying guide device designed to serve in automated warehouses has a guide rail that guides the transport vehicle. The transport vehicle has a carrying platform. The vehicle runs along the rail astride it and linked by connecting guides. The guide rail is located beneath an upper surface of the carrying platform so that material carried thereon can be transferred across the rail to staging areas on the other side of the rail. By locating the vehicle astride the rail, the guide rail, which projects upwardly from the floor, does not interfere with access to the carrying platform. In an embodiment of the invention, the drive wheel of the vehicle is located at a longitudinal midpoint of the transport vehicle to minimize the parasitic effects on the guides connecting the vehicle to the rail generated by application of traction forces, applied by a drive wheel, to the side of the rail.

According to an embodiment of the present invention, there is provided, a guided transport vehicle, comprising: a self-propelled transport vehicle movably connectable to a guide rail shaped to guide the vehicle along a travel path, loading and unloading stages, located at respective points along the travel path, each having a respective mounting surface to support a load carried by the vehicle and the guide rail being positioned beneath the respective mounting surface at the points.

According to another embodiment of the present invention, there is provided, a guided transport vehicle, comprising: a guide affixable to a floor, a transport vehicle movably supported by the floor and movably connected, by a connecting guide, to follow the guide, the transport vehicle having a carrying surface located substantially on one side of the guide such that the carrying surface is accessible to permit a moving of the load carried on the carrying surface between the carrying surface and a position adjacent the carrying surface without crossing the guide, the transport vehicle having a motor-drive to permit the transport vehicle to move along the guide, at least one first loading stage located at a point along the guide on a side of the guide opposite the carrying surface.

According to still another embodiment of the present invention, there is provided, a guided transport vehicle, comprising: a guide affixable to a floor, a transport vehicle movably supported by the floor and movably connected, by a connecting guide, to follow the guide, the transport vehicle having a carrying surface located substantially on one side of the guide such that the carrying surface is accessible to permit a moving of the load carried on the carrying surface between the carrying surface and a position adjacent the carrying surface without crossing the guide, the transport vehicle having a motor-drive to permit the transport vehicle to move along the guide, at least one first loading stage located at a point along the guide on a side of the guide opposite the carrying surface.

According to still another embodiment of the invention, a transport vehicle and guide device include a guide, a self-propelled transport vehicle guided along a travel path, a guide rail along this guide path and coming into contact with the guide, and a load carrying section along the travel path and having a carrying surface for transferring loads from the transport vehicle. The guide rail is positioned underneath the carrying surface at the load carrying section. With the above structure, other transport vehicles, such as forklift trucks, can move close to the carrying surface of the load carrying area without being obstructed by the guide rail, thereby facilitating the transfer of loads to, or from, the load carrying area.

With the invention, access to the load carrying area of a rail-guided transport vehicle, is made available to forklifts and other transporters, including automatic vehicles guided by magnetic induction. The advantages described above of rail-guided vehicles are maintained while facilitating the use of other transport vehicles. This greatly expands the range of applications for which the rail-guided transport vehicles can be used.

In an embodiment of the present invention, the guide rail includes a power-supply rail that supplies electricity to the transport vehicle. This makes it possible to supply the transport vehicle with drive power. Thus, the need to load a power supply such as a battery onto the transport vehicle is eliminated, and there is no need to set up device for recharging batteries. This enables operation over long periods of time. Furthermore, by positioning the power-supply rail under the carrying surface of a device according to the invention, the power-supply rail is prevented from obstructing other transport vehicles such as forklifts. Thus, loads can be transferred to and from the load carrying area using a forklift or the like.

By adding an arcuate section to the guide rail, the travel path can be made more flexible compared to applications having only a linear guide rail. Furthermore, by having the transport vehicle move on the outer side of the arcuate section of the guide rail, and by having the load carrying area located on the inner side of the arcuate section, it is possible to use a shorter guide rail relative to the travel path of the transport vehicle, and the area needed for installation is decreased as well, making this configuration economical and convenient.

It would be possible to have the transport vehicle move on the inner side of the arcuate section of the guide rail, and to have the load carrying area located on the outer side of the arcuate section. This requires a slight increase in the length of the guide rail and the area needed for installation, but the resulting larger diameter of the arcuate section provides smoother motion for the transport vehicle at the arcuate section, and the transport vehicle can move along the arcuate section at a higher speed. This provides overall improvements in efficiency in the transport of loads.

It would be possible to have the guide rail described above form a loop. In such a configuration, the transport vehicle travels in only one direction on the guide rail. This makes it possible for a plurality of transport vehicles to move simultaneously on the guide rail loop to provide further increases in performance and efficiency.

When the transport vehicle is configured to move along the inside of the guide rail loop, the transport vehicle is able to move smoothly and rapidly. By providing for a section of the guide rail loop to be detachable, it is possible for that section to be removed and to allow other transport vehicles such as forklifts to move to the inside of the guide rail loop. This also allows other transport vehicles to transfer loads to and from the load carrying area without interference from the rails.

When the load carrying area includes a transport entry/exit conveyor, the load carrying area can serve to convey loads to and from storage shelves in an automated warehouse. This allows the transport vehicle of the invention to be employed in an automated warehouse. In contrast to conventional transport entry/exit conveyors, which are dedicated for use with conventional rail-guided transport vehicles, this arrangement makes it possible for other types of transport vehicles such as forklifts and transport vehicles based on magnetic induction to transport loads. This greatly increases the flexibility of automated warehouses and provides improved utility.

In a preferred embodiment, the transport vehicle described above includes a drive wheel, preferably a non-steerable wheel, and a driven wheel, which serves as a non-steerable wheel. The guide of the transport vehicle includes a first and a second guide located on the transport vehicle and separated by a length-wise interval. When the position of the drive wheel is on an imaginary line that goes through roughly the center of the length-wise interval between first guide S1 and second guide S2 and that extends laterally in a direction perpendicular to the length-wise interval, then the distance from the first guide to the drive wheel is equal to the distance from the second guide to the drive wheel. The rotation moment resulting from the counter-force generated at first guide S1 cancels out the rotation moment resulting from the counter-force generated at the second guide. As a result, the force on the first guide caused by the counter-force described above is deflected, thus inhibiting misalignment between the guide rail and the first and second guides. Also, the rotation force of the drive wheel is efficiently applied to propel the vehicle body and provides smooth motion. Furthermore, by having both the drive wheel and the driven wheel be non-steerable wheels, the need for a steering mechanism is eliminated, thus simplifying the structure.

By having the guide project outwardly from the side of the vehicle body, the guide can be used to guide the vehicle along the guide rail, even if the guide rail is next to a wall. Thus, when the motion path on the floor is to be used for things other than the transport vehicle, the guide rail tends to not be an obstruction. This allows the space to be used efficiently while also allowing the transport vehicle to be used.

When the drive wheel described above is located at a position shifted toward the guide from the midpoint of the lateral width of the vehicle, the drive wheel approach the guide very closely. Thus, the propulsion force from the drive wheel could rotate the vehicle about the guide. This could result in misalignment between the guide and the guide rail. However, since the distance between the drive wheel and the guide is short, the misalignment is minimal, thus providing smooth motion of the guide along the guide rail.

When the transport vehicle includes one drive wheel and two driven wheels, the drive wheel and the driven wheels are reliably in contact with the floor even when there is unevenness. This provides stable and reliable motion of the vehicle regardless of the evenness of the floor.

When the transport vehicle is positioned inward from the arcuate section, it is possible to have the curvature of the arcuate section and the position of the drive wheel set so that the drive wheel is positioned between the center of rotation and the guide rail. In this arrangement, even if the guide rail is curved arcuately and the drive wheel moves inside of the arcuate section, the propulsive effect of the drive wheel is utilized effectively, and the vehicle operates smoothly and reliably.

When the first and second guides described above comprise a pair of guide rollers separated by a longitudinal interval and located on one side of the guide rail and a pair of guide rollers separated by a longitudinal interval and located on another side of the guide rail, then even if the guide rail is curved, a situation where either the left-side or the right-side guide rollers completely disengages from the rail would be unlikely since at least one of the guide rollers on the left or right side would be engaged. Thus, regardless of whether the guide rail is curved or not, the transport vehicle described above can be reliably operated along the guide rail with good precision.

When roller supports rotatably supporting the guide rollers via a vertically extending shaft are located on the guide rollers, the roller supports will rotate so that, even when the guide rail is curved, two guide rollers on the left as well as right sides will be engaged whenever possible. Thus, regardless of whether the guide rail is curved or not, the vehicle operates reliably with improved precision along the guide rail.

Further and other objects, features and effects of the invention will become more apparent from the following more detailed description of the embodiments of the invention taken with reference to the accompanying drawings.

DETAILED DESCRIPTION OF THE PREFERRED EMBODIMENTS

Figure 1:
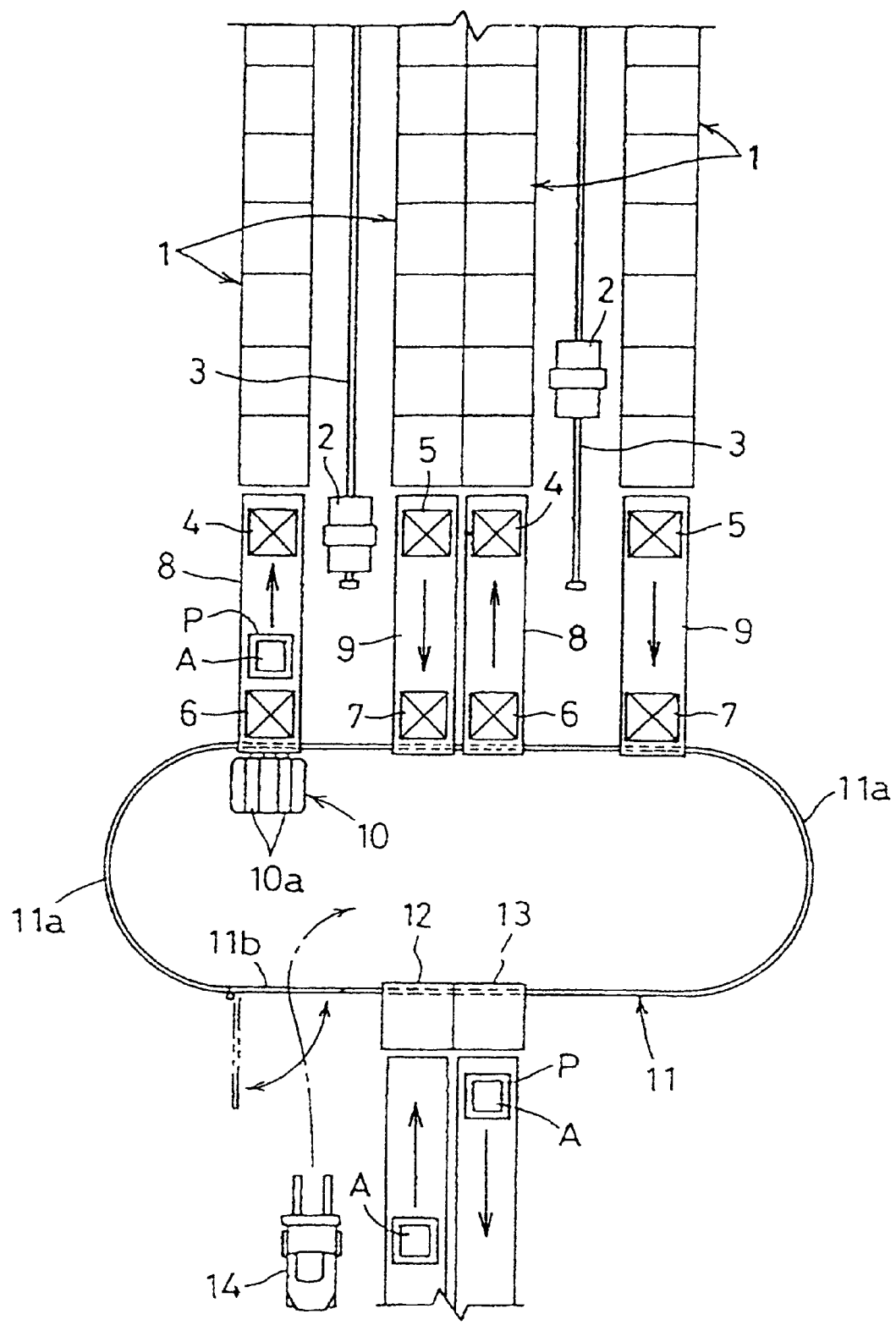
FIG. 1 is a plan view of an automated warehouse in which a vehicle for moving loads and accompanying guide device according to the present invention is implemented.

Referring to FIG. 1, a transport vehicle, usable in an automated warehouse is shown. An automated warehouse has storage shelves 1 for holding various loads A carried on pallets P. Shelves 1, configured with a plurality of sections for loading and holding pallets P, are arranged in vertical and horizontal arrays. Facing pairs of shelves comprise a set. FIG. 1 shows two sets of shelves.

Between facing storage shelves 1 in a set, a stocker crane 2 moves along rail 3. Stocker crane 2 has a platform, a fork or the like, that can move up and down. Stocker crane 2 takes load A carried on a pallet at a transport lifter 4 located toward the entrance of storage shelves 1 and transports it to a storage section of storage shelves 1. Stocker crane 2 also takes load A at a storage section and transports it to transport lifter 5.

A transport mounting lifter 6 in front of transport lifter 4 mounts loads onto one end of a conveyor 8. Another transport lifter 7 is located in front of transport lifter 5 to mount loads at the opposite end of conveyor 9. Transport conveyor 8, located between transport mounting Sifter 6 and transport lifter 4, mounts load A from mounting lifter 6 onto a pallet and transport it to transport lifter 4. Also, a transport conveyor 9 is located between transport mounting lifter 7 and transport lifter 5 to mount load A from mounting lifter 5 onto a pallet and transport it to transport lifter 7.

More specifically, transport lifter 4 and transport mounting lifter 6 are located in transport conveyor 8 and form a section of transport conveyor 8, which is a chain-transport conveyor. Similarly, transport lifter 5 and transport mounting lifter 7 are located in transport conveyor 9 and form a section of transport conveyor 9.

Figure 2:
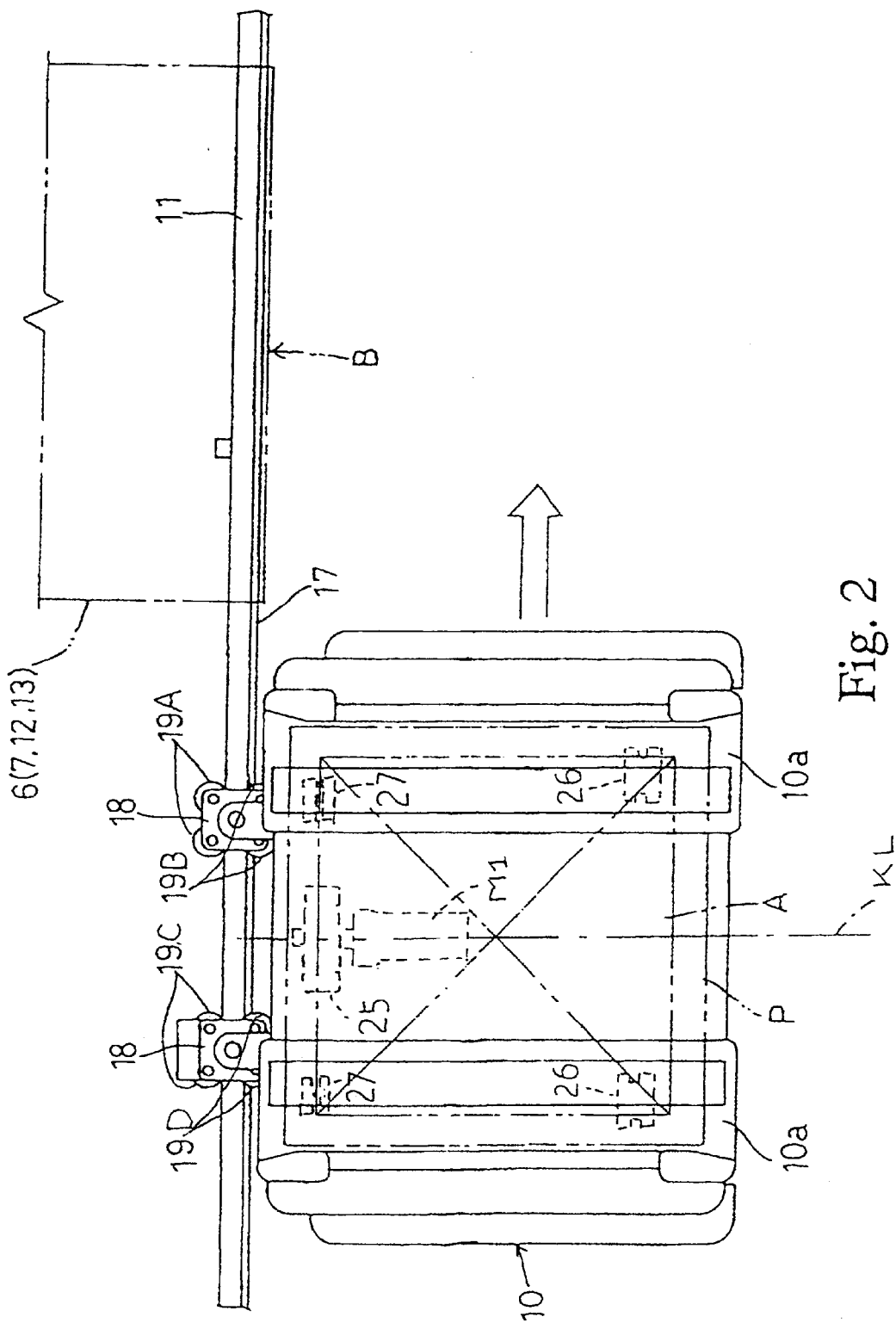
FIG. 2 is a plan view showing the important sections of the vehicle for moving loads and accompanying guide device according to the present invention.

Referring to FIG. 2, a self-propelled transport vehicle 10 includes a fork 10a that can be extended or withdrawn. Transport vehicle 10 travels over, and is supported by, a floor. Transport vehicle 10 travels between transport mounting lifter 6 and transport mounting lifter 7. A single guide rail 11 is arranged along a travel path to guide transport vehicle 10.

The single guide rail 11 forms a loop with two arcuate sections 11a. Loop-shaped guide rail 11 permits a plurality of transport vehicles 10 to travel simultaneously.

Load transport sections 12 and 13 are located on the outside of loop-shaped guide rail 11 to permit loading and off-loading of loads. Transport vehicle 10 uses fork 10a to pick up pallet P and load A at load transport section 12 and transports them to transport mounting lifter 6. Also, transport vehicle 10 picks up pallet P and load A at transport mounting lifter 7 and transports them to load transport section 13. These are examples and other loading and off-loading patterns are possible with the arrangement shown in FIG. 1. The above are examples of loading and unloading devices. Such loading and unloading devices or platforms are referred to in the present specification as staging areas staging platforms, loading or unloading stages, or loading stages and intended to apply to any surface or device to which an object to be transported can be off-loaded from the vehicle or loaded onto the vehicle.

A section 11b of loop-shaped guide rail 11 can be removed or opened to permit transport vehicles, such as a forklift 14 to drive inside loop-shaped guide rail 11 through a gap formed by such removal or opening.

Figure 3:
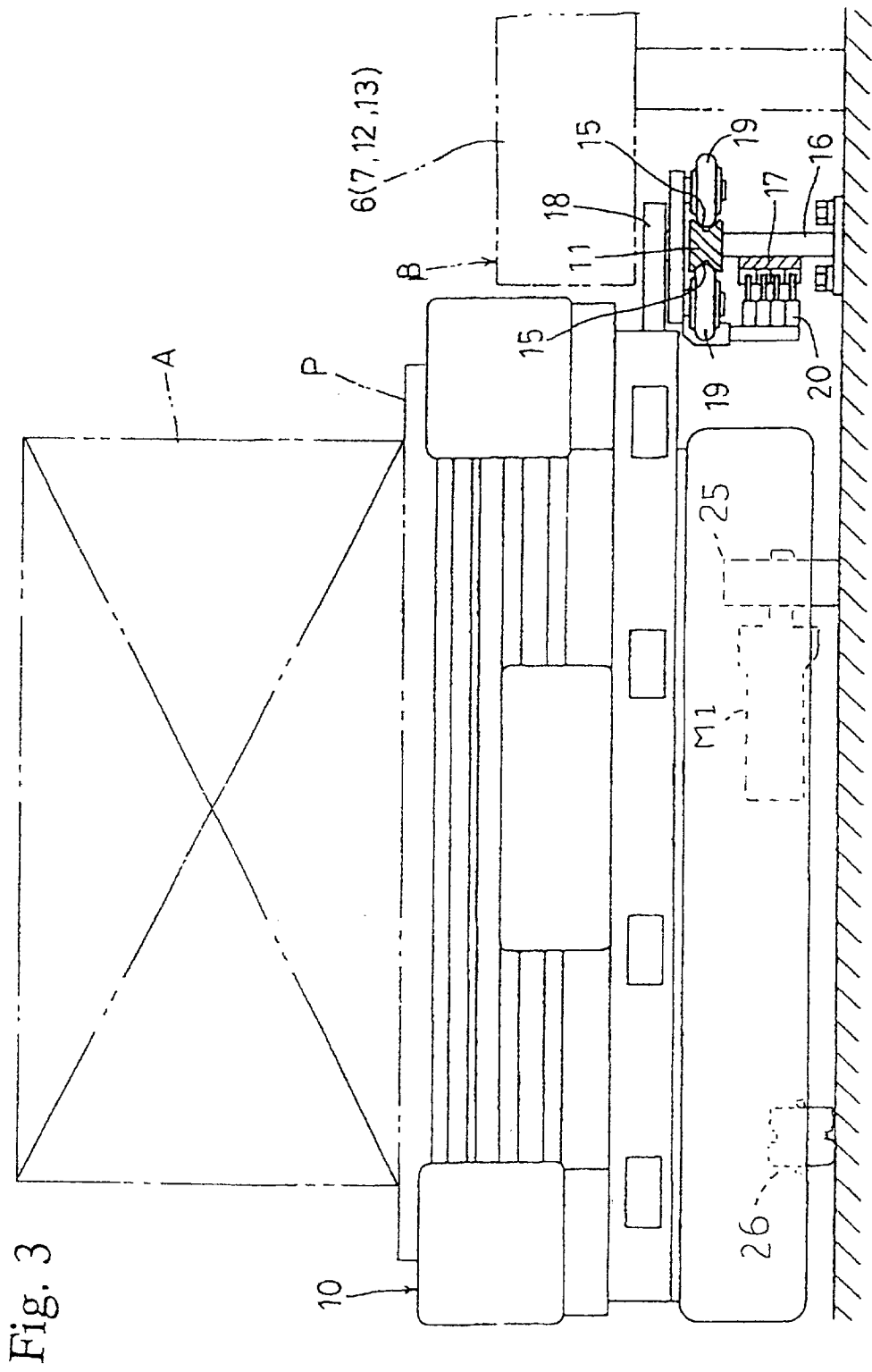
FIG. 3 is a front-view of the section shown in FIG. 2.

Referring to FIG. 3, guide rail 11 is symmetric with respect to its right and left sides, V-shaped channels 15 are defined symmetrically in the sides of guide rail 11. V-shaped channels 15 run continuously along the length of guide rail 11. A plurality of legs 16 support guide rail 11 so that it is substantially parallel to the floor.

As best seen in FIG. 3, guide rail 11 is located so that it is completely under mounting surface B carrying load A on the load mounting area. That is, guide rail 11 is entirely below the load carrying surfaces of transport mounting lifters 6 and 7 and load transport entry/exit sections 12 and 13. In addition, a power-supply rail 17, attached to legs 16, which support guide rail 11, runs continuously along guide rail 11. Power-supply rail 17 supplies electricity to drive transport vehicle 10. Power-supply rail 17 is also located so that it is completely under the mounting surfaces, for example, mounting surface B of mounting lifter 6, etc.

At movable section 11b of guide rail 11, power-supply rail 17 includes appropriate electrical connectors to allow connections to be made and broken when section 11b is opened or moved.

Also, transport vehicle 10 includes a guide section with first guide trucks 19A, 19B and second guide trucks 19C, 19D. First guide trucks 19A, 19B and second guide trucks 19C, 19D are located toward the front and rear of transport vehicle 10, separated by a fixed interval. First guide trucks 19A and 19B include pairs of opposing guide rollers 19 toward one side of guide rail 11 and separated by a longitudinal interval from each other. Guide rollers 19 are rotatably attached to a frame 18 via corresponding shafts extending vertically.

A wiper assembly 20 is located on one of the front and rear support members 18 and comes into contact with power-supply rail 17. Drive power is supplied to transport vehicle 10 via power-supply rail 17 and wiper assembly 20. The entirety of support member 18, including wiper assembly 20 and first and second guide rollers 19A, 19B, 19C, 19D, is located and configured so that it fits beneath mounting surface B of the load mounting areas of each device, for example, load transport mounting lifter 6.

Referring to FIGS. 2 and 3, transport vehicle 10 has a single drive wheel fixed to the vehicle body and driven by a motor M1. Four sets of driven wheels 26 and 27 support transport vehicle 10. Note that FIG. 3 is a simplified drawing and does not show driven wheels 27.

Figure 8:
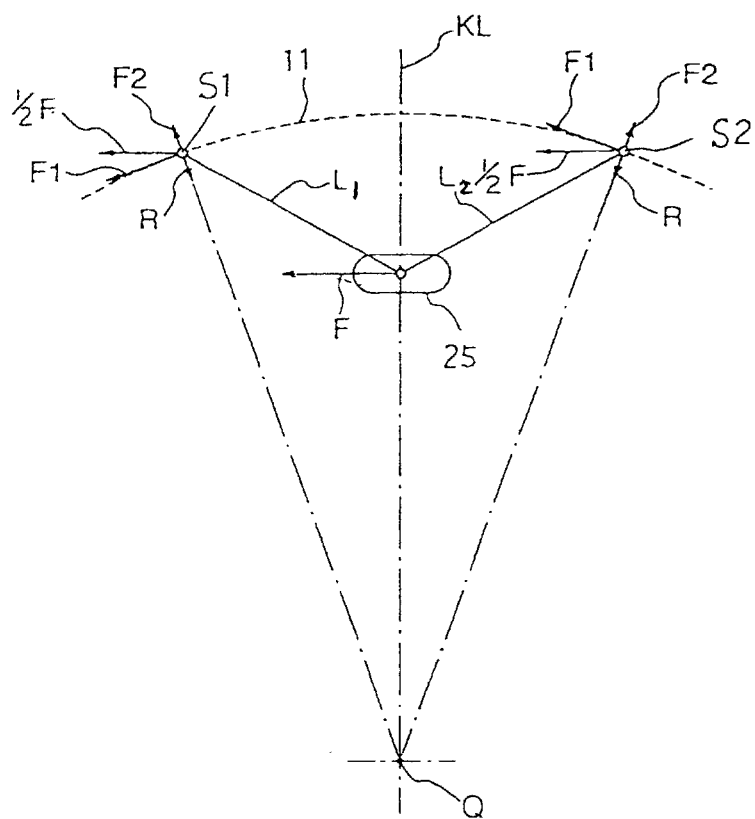
FIG. 8 shows the forces applied to the guide roller based on the drive force from the drive wheel.

Referring to FIG. 8, component forces F1 and F2 are the tangential component forces of a component force ½F at first guide S1 and second guide S2, where drive force F is a force generated by drive wheel 25. Along the lateral axis of transport vehicle 10, drive wheel 25 is positioned toward the guide section away from the center of the lateral width of the vehicle body. Also, the positioning of drive wheel 25 and the curvature of the arcuate sections of guide rail 11 are set so that the drive wheel is positioned between center of rotation Q and guide rail 11. First and second guide trucks each have four guide rollers which transmit steering forces and parasitic moments generated by drive wheel 25 (generally, "aligning forces"), through respective guide points S1 and S2 Drive wheel 25 is positioned on an imaginary line KL positioned roughly midway in the longitudinal interval between first guide point S1 and second guide point S2 and extending in the lateral direction (perpendicular to the forward/rearward axis that is tangential to the path of movement). Line KL may be defined as the locus of points that are equally distant from points S1 and S2. A distance L, between first guide point S1 and drive wheel 25 (More precisely, the point at which drive wheel 25 makes contact with the floor) is equal to a distance $L_2$ between point S2 and drive wheel 25. The rotation moment, caused by traction force F, from a counter-force R generated at first guide S1 cancels out a rotation moment from a counter-force R generated at second guide S2 without the generation of strong parasitic forces between the guide rollers and the rail. As a result, a force on first guide S1, caused by counter-force R, is smoothly compensated insuring accurate alignment between guide rail 11 and the first and second guides acting through points S1 and S2. Thus, in effect, traction forces generated by drive wheel 25 are efficiently aligned with the tangent of the travel path and transport vehicle 10 is driven smoothly and responsively.

Referring to FIG. 2, driven wheels 26 and 27 are positioned on the side of the vehicle body opposite from that of drive wheel 25. Driven wheels 26, which are separated by an interval along the front/rear axis are fixed so that their direction relative to the vehicle body remains constant.

Driven wheels 27 may pivot about respective vertical shafts (not shown in the drawings) to allow the orientation of the wheels to change.

Alternative embodiments

The following is a description of alternative embodiments and modifications that can be made to the embodiment of the invention described above. The embodiment descriptions below are not exclusive and where they do not contradict the embodiment described above, it is possible to combine the different aspects of the embodiments while remaining within the scope of the invention.

In the previous embodiment, guide rail 11 is a loop. However, different variations on guide rail 11 can be implemented to accommodate the installation site and the like.

Figure 4:
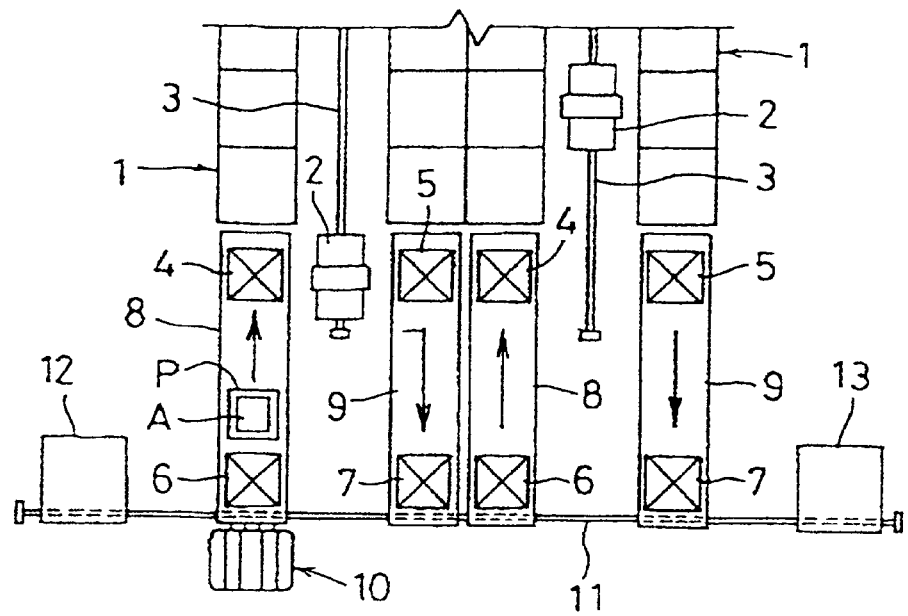
FIG. 4 is a plan view showing an alternative embodiment of the vehicle for moving loads and accompanying guide device according to the present invention.

Referring to FIG. 4, it would be possible to locate transport entry section 12 and transport exit section 13 (with transport exit mounting lifters 6 and 7, respectively) on either end of a linear (or-non-linear) guide rail 11. Transport vehicle 10 would move back and forth along linear guide rail 11 to transfer loads to and from conveyors 8 and 9.

Figure 5:
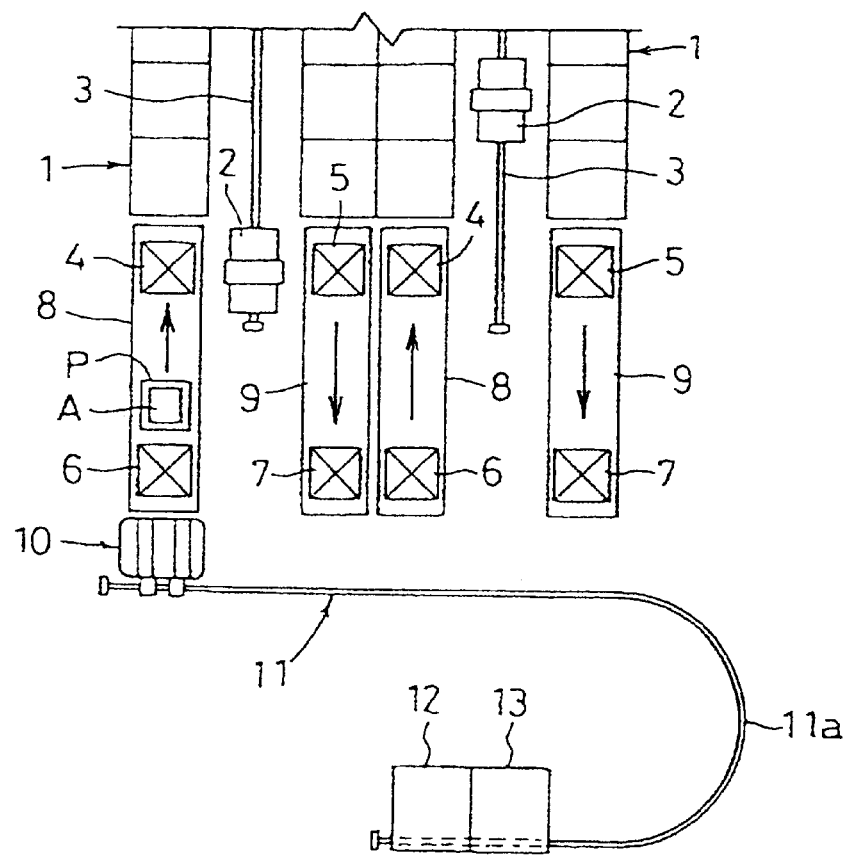
FIG. 5 is a plan view showing yet another embodiment of the vehicle for moving loads and accompanying guide device according to the present invention.

Referring to FIG. 5, it would also be possible to combine a linear guide rail 11 and a single arcuate section 11a. Transport vehicle 10 could then move back and forth toward the outside of arcuate section 11a, while the load mounting areas, i.e. transport entry section 12 and transport exit section 13, can be located toward the inside of arcuate section 11a.

Similarly, it would be possible to use a combination of a linear guide rail 11 and a single arcuate section 11a and have transport vehicle 10 move toward the inside of arcuate section 11a. In this case, the load mounting area, i.e. transfer lifters 6, 7 for transport entry and transport exit sections 12, 13, would all be located outside arcuate section 11a.

Figure 6:
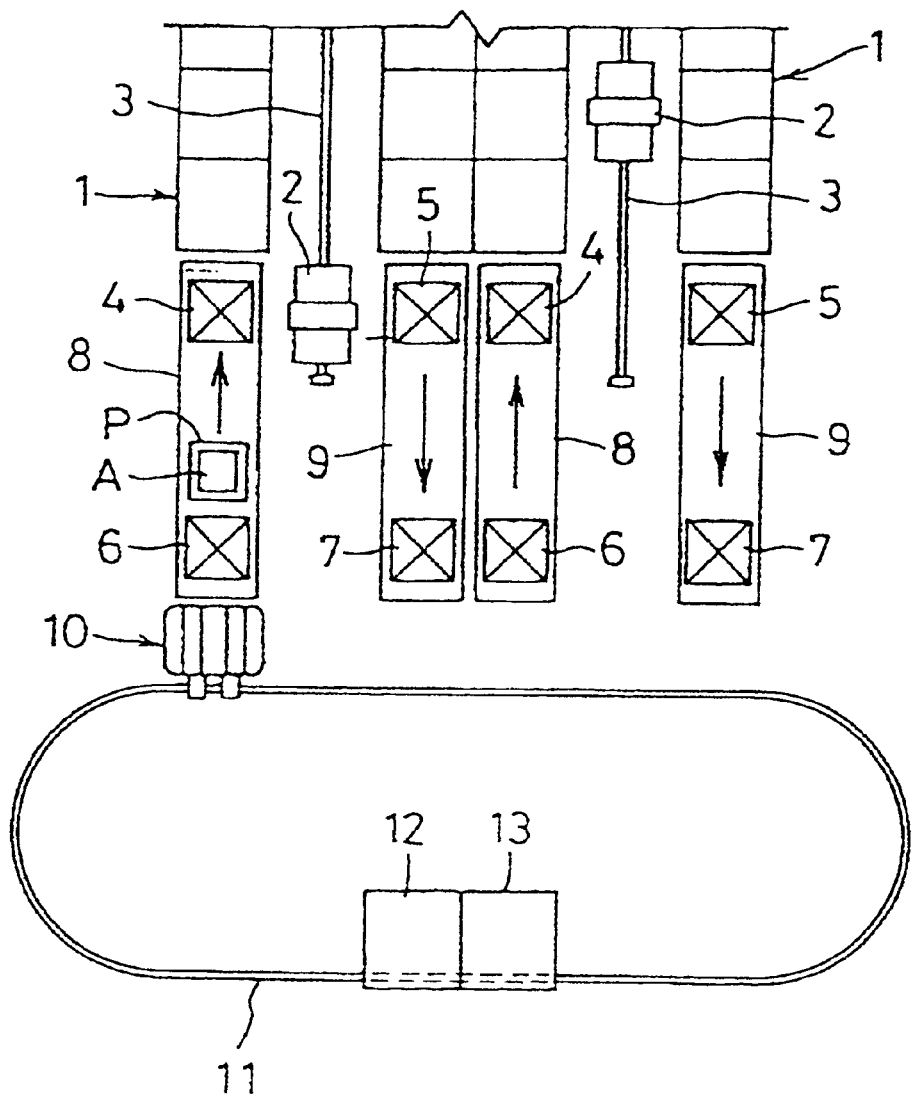
FIG. 6 is a plan view showing yet another embodiment of the vehicle for moving loads and accompanying guide device according to the present invention.

Referring to FIG. 6, it would also be possible to have guide rail 11 form a loop and have transport vehicle 10 travel on the outer side of the loop. In this case, the load mounting area, i.e. transport entry/exit sections 12, 13, would be located on the inner side of guide rail 11.

The embodiments described above have all used only one guide rail 11, but it would also be possible to implement the present invention with two or more guide rails 11.

Also, in load mounting areas 6, 7, 12, 13, guide rail 11 is entirely located beneath transfer surface B. However, it would also be possible to have a portion of guide rail 11 project from mounting surface B of load mounting areas 6, 7, 12, 13, as long as there is no obstruction to forklift 14 or the like. The same applies to power-supply rail 17, and it is not absolutely necessary for power-supply rail 17 to be entirely located beneath transfer surface B.

Figure 7:
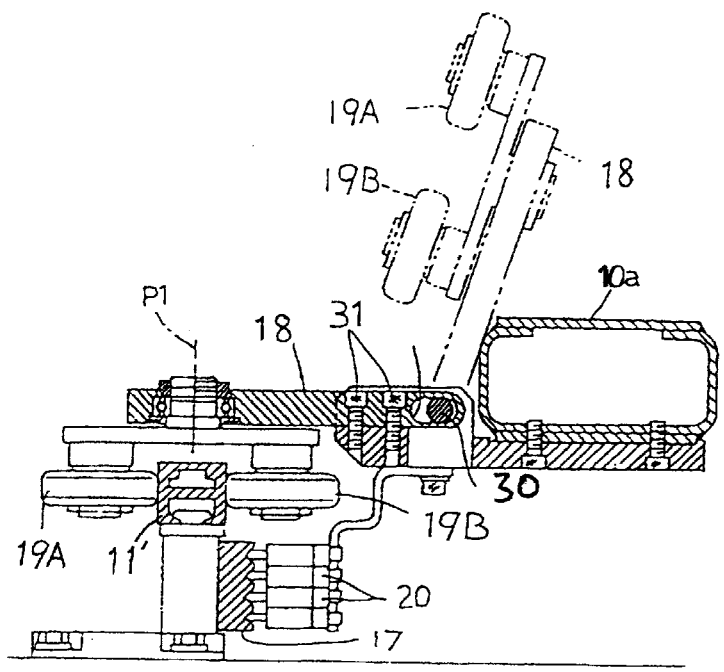
FIG. 7 is a cross-section view showing a guide rail and a guide member from another embodiment.

Furthermore, in the embodiments described above, a pair of support members are affixed to the vehicle body. Referring to FIG. 7, however, it would be possible to allow the truck to pivot around a shaft 30 so that the guide rollers can be in contact with guide rail 11' or be moved away from guide rail 11'. In normal operation, the guide rollers would be positioned so that they are in contact with guide rail 11' and could be firmly held in position with respect to the vehicle body via bolts 31. When transport vehicle 10 is to be removed from the guide, bolts 31 could be removed and support member 18 is pivoted around shaft 30, moving the guide rollers away from guide rail 11'. The retracted position is indicated by broken lines in FIG. 7. To permit the disengagement of the guide rollers from guide rail 11', the cross-sectional shape of the guide rail would have to be shaped appropriately, as in the example shown where the shape is rectangular.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A guided-vehicle transport system for transporting a load comprising:

a self-propelled transport vehicle including at least first and second guide trucks cooperating with a guide rail shaped to guide said vehicle along a travel path;

each of said at least first and second guide trucks has at least one pair of guide rollers opposed across and contacting said guide rail in a lateral direction:

each of said at least first and second guide trucks movable in unison with said at least one pair of guide rollers to a position where said at least one pair of guide rollers is clear of said guide rail thereby disengaging a respective guide truck from said guide rail;

said vehicle supported solely by a plurality of wheels on a supporting surface, at least one of which is a drive wheel;

said at least one drive wheel contacts said supporting surface at a location substantially on a line defined by a locus of points equidistant from a center of said at least first and second guide trucks; and loading and unloading stages, located at respective points along said travel path, each having a respective mounting surface to support said load carried by said vehicle.

2. A guided-vehicle transport system as in claim 1, comprising:

said guide rail includes a power-supply rail running along said guide rail;

said power-supply rail being connectable to said transport vehicle; and said power-supply rail being positioned beneath said respective mounting surface at said points.

3. A guided-vehicle transport system as in claim 2, wherein said loading stage includes a transport entry/exit conveyor.

4. A guided-vehicle transport system, as in claim 2, wherein:

said guide rail includes an arcuate section so that said travel path has a corresponding arcuate portion;

said vehicle is connected to said guide rail such that said vehicle remains on a convex side of said arcuate portion; and said load mounting area is located on a concave side of said arcuate section.

5. A guided-vehicle transport system, as in claim 2, wherein:

each of said first and second guide trucks includes two pairs of guide rollers;

each pair of guide rollers being separated by a fixed distance in a direction of a tangent to said travel path; and each pair of guide rollers having a first guide roller located on a side of said guide rail opposite a second guide roller.

6. A guided-vehicle transport system as in claim 5, wherein:

said guide rollers are supported to rotate about substantially vertical axes when said guide trucks are engaged with said guide rail.

7. A guided-vehicle transport system, as in claim 1, wherein:

said guide rail includes an arcuate section so that said travel path has a corresponding arcuate portion;

said vehicle is connected to said guide rail such that said vehicle remains on a convex side of said arcuate portion; and said load mounting area is located on a concave side of said arcuate section.

8. A guided-vehicle transport system, as described in claim 2, wherein:

said guide rail includes a closed loop so that said travel path has a corresponding closed loop portion;

said vehicle is connected to said guide rail such that said vehicle remains on a concave side of said closed loop; and a section of said guide rail is openable selectively to create an access to said closed loop.

9. A guided-vehicle transport system as in claim 1, wherein said loading stage includes a transport entry/exit conveyor.

10. A guided-vehicle transport system, as in claim 1, wherein said at least one drive wheel runs alongside said vehicle.

11. A guided-vehicle transport system as in claim 10, wherein said at least one drive wheel is located substantially in a lateral center of said vehicle.

12. A guided-vehicle transport system as in claim 1, wherein:

said guide rail includes an arcuate section with a center of curvature; and when said transport vehicle is positioned on a concave side of said guide rail along said arcuate section, said at least one drive wheel is positioned between said guide rail and said center of curvature.

13. A guided-vehicle transport system as in claim 1, wherein:

each of said first and second guide trucks includes two pairs of guide rollers;

each pair of guide rollers being separated by a fixed distance in a direction of a tangent to said travel path: and each pair of guide rollers having a first guide roller located on a side of said guide rail opposite a second guide roller.

14. A guided-vehicle transport system as in claim 13, wherein said guide rollers are supported to rotate about substantially vertical axes when said guide trucks are engaged with said guide rail.

15. A guided-vehicle transport system according to claim 1, wherein said guide rail is positioned below and beneath said respective mounting surfaces at said points, whereby at least a portion of said guide trucks are guided to pass below and beneath said respective mounting surfaces.

16. A guided-vehicle transport system according to claim 1, wherein:

at least one of said loading and unloading stages are on a same side of said guide rail as said vehicle; and said load is transferable between said at least one of said loading and unloading stages and said vehicle in a lateral direction to that of a direction of vehicle travel without crossing said guide rail.

* * * * *